(12) United States Patent
Zhang et al.

(10) Patent No.: US 11,537,223 B2
(45) Date of Patent: Dec. 27, 2022

(54) INTERACTIVE DEVICE, SENSING SCREEN, INTERACTIVE SYSTEM, AND POSITIONING METHOD

(71) Applicants: Beijing BOE Display Technology Co., Ltd., Beijing (CN); BOE Technology Group Co., Ltd., Beijing (CN)

(72) Inventors: Qian Zhang, Beijing (CN); Xintong Wu, Beijing (CN); Lei Liu, Beijing (CN); Longyue Gao, Beijing (CN); Yue Guo, Beijing (CN)

(73) Assignees: Beijing BOE Display Technology Co., Ltd., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/427,620

(22) PCT Filed: Jan. 7, 2021

(86) PCT No.: PCT/CN2021/070642
§ 371 (c)(1),
(2) Date: Jul. 30, 2021

(87) PCT Pub. No.: WO2021/147685
PCT Pub. Date: Jul. 29, 2021

(65) Prior Publication Data
US 2022/0100312 A1    Mar. 31, 2022

(30) Foreign Application Priority Data

Jan. 21, 2020  (CN) .................. 202010072462.X

(51) Int. Cl.
*G06F 3/038*    (2013.01)
*G06F 3/042*    (2006.01)
(Continued)

(52) U.S. Cl.
CPC ............ *G06F 3/0386* (2013.01); *G06F 3/042* (2013.01); *G06F 3/0421* (2013.01);
(Continued)

(58) Field of Classification Search
CPC ..... G06F 3/0354–03545; G06F 3/0386; G06F 3/0421; G06F 3/0423; G06F 3/042; G06F 3/04166; G02B 26/10
See application file for complete search history.

(56) References Cited

U.S. PATENT DOCUMENTS

2017/0242261 A1    8/2017  Lee et al.
2018/0136788 A1    5/2018  He et al.
(Continued)

FOREIGN PATENT DOCUMENTS

CN    202904536 U    4/2013
CN    103576919 A    2/2014
(Continued)

*Primary Examiner* — Xuemei Zheng
(74) *Attorney, Agent, or Firm* — IPRO, PLLC

(57) ABSTRACT

The present disclosure provides an interactive device, an inductive screen, an interactive system, and a positioning method, and relates to the field of display technologies, with an objective of providing a low-cost positioning and interactive method. The interactive device includes: a first housing, a first end of the first housing having a light-exit opening; a first light-emitting component, arranged inside the first housing and configured to emit a linear light beam through the light-exit opening of the first housing, the linear light beam rotating with rotation of the first housing; and a driving component, connected to a second end of the first housing opposite to the first end and configured to drive the first housing to rotate.

20 Claims, 4 Drawing Sheets

(51) Int. Cl.
  *G06F 3/041* (2006.01)
  *G02B 26/10* (2006.01)
  *G02B 27/09* (2006.01)

(52) U.S. Cl.
  CPC .......... *G06F 3/04166* (2019.05); *G02B 26/10* (2013.01); *G02B 27/09* (2013.01)

(56) References Cited

U.S. PATENT DOCUMENTS

| | | |
|---|---|---|
| 2019/0179445 A1 | 6/2019 | Moon |
| 2020/0103987 A1 | 4/2020 | Li et al. |

FOREIGN PATENT DOCUMENTS

| | | | | |
|---|---|---|---|---|
| CN | 104238774 A | 12/2014 | | |
| CN | 206115398 U | 4/2017 | | |
| CN | 109240522 A | 1/2019 | | |
| DE | 102009041879 A1 * | 3/2011 | ............. | G06F 3/012 |
| EP | 2693303 A1 | 2/2014 | | |
| WO | WO-2004077197 A2 * | 9/2004 | ........... | G06F 3/0386 |

\* cited by examiner

INTERACTIVE DEVICE, SENSING SCREEN, INTERACTIVE SYSTEM, AND POSITIONING METHOD

CROSS REFERENCE TO RELATED APPLICATION

The present disclosure claims priority to Chinese Patent Application No. 202010072462.X, titled "INTERACTIVE DEVICE, SENSING SCREEN, INTERACTIVE SYSTEM, AND POSITIONING METHOD" and filed to the State Patent Intellectual Property Office on Jan. 21, 2020, the entire contents of which are incorporated herein by reference.

TECHNICAL FIELD

The present disclosure generally relates to the field of display technologies and, more particularly, to an interactive device, an inductive screen, an interactive system, and a positioning method.

BACKGROUND

Benefiting from the rapid rise of the "Internet Plus", Liquid Crystal Display (LCD) and Organic Light-Emitting Diode (OLED) display technologies have developed rapidly in the past decades. Finger touch technologies such as Touch on Cell technologies (touch sensors are embedded into pixel cells) and Touch in Cell technologies (touch sensors are embedded into display substrates) associated with the LCD and OLED display technologies have been developed and applied in all aspects in both small-sized display apparatuses and large-sized display apparatuses. Compared with traditional indirect interaction between fingers and keyboards, mouses and screens, this direct interaction between human fingers and screens greatly improve user convenience experience. Therefore, the finger touch technologies are rapidly popularized in terminal markets.

SUMMARY

Embodiments of the present disclosure provide an interactive device, an inductive screen, an interactive system, and a positioning method.

The embodiments of the present disclosure adopt following technical solutions.

In one aspect, there is provided an interactive device, which includes:
  a first housing, a first end of the first housing having a light-exit opening;
  a first light-emitting component, arranged inside the first housing and configured to emit a linear light beam through the light-exit opening of the first housing, the linear light beam rotating with rotation of the first housing; and
  a driving component, connected to the first housing and configured to drive the first housing to rotate.

Alternatively, the first light-emitting component is at least partially arranged inside the first housing, or is connected to the first housing.

Alternatively, the driving component is connected to a second end of the first housing opposite to the first end.

Alternatively, the light-exit opening of the first housing is provided with a slit aperture.

Alternatively, the first light-emitting component includes:
  a first light source, configured to emit an invisible light beam; and
  an optical component, configured to expand the invisible light beam emitted from the first light source;
  wherein the invisible light beam emitted from the first light source is emitted after passing through the optical component and the slit aperture in sequence.

Alternatively, the interactive device also includes:
  a second light-emitting component, configured to emit a visible light beam.

The visible light beam can be projected to outside of the interactive device.

Alternatively, the interactive device also includes:
  a second housing, wherein the first light-emitting component, the first housing and the driving component are arranged inside the second housing.

Alternatively, the second light-emitting component is arranged outside the second housing.

Alternatively, the second light-emitting component includes a second light source, and the second light source is a laser light source.

Alternatively, the first light source is any one of an infrared diode light source, an infrared laser light source, an ultraviolet diode light source, and an ultraviolet laser light source.

In another aspect, an inductive screen is provided, which includes: a photovoltaic sensor arranged on two opposite sides of the inductive screen. The photovoltaic sensor is configured to sense a linear light beam emitted from the interactive device in each sampling, and output locations of sensing points on two sides; and A processor, configured to: calculate a straight-line equation determined by the sensing points on the two sides according to the locations of the sensing points on the two sides in the same sampling; and determine a directing point of the interactive device on the inductive screen according to a plurality of straight-line equations determined by a plurality of samplings in a sampling period.

Alternatively, the processor is configured to: determine, in a sampling period when the directing point of the interactive device on the inductive screen is fixed, a plurality of the same first intersection points according to the plurality of straight-line equations determined by the plurality of samplings in the sampling period, each of the plurality of first intersection points being an intersection point of two of the plurality of straight-line equations determined by two samplings; and determine the directing point of the interactive device on the inductive screen as the first intersection point.

Alternatively, the processor is configured to: determine, in a sampling period when the directing point of the interactive device on the inductive screen is moving, a plurality of different second intersection points according to the plurality of straight-line equations determined by the plurality of samplings in the sampling period, each of the plurality of second intersection points being an intersection point of two of the plurality of straight-line equations determined by two samplings; and determine the directing point of the interactive device on the inductive screen as a geometric center point of an area formed by the plurality of second intersection points.

In still another aspect, an interactive system is provided, which includes the interactive device and the inductive screen.

In still another aspect, there is provided a positioning method applied to the interactive system, and the interactive system includes the interactive device and the inductive screen;

the method including:
sensing, in each sampling, a linear light beam emitted from the interactive device, and outputting locations of sensing points on two sides;
calculating a straight-line equation determined by the sensing points on the two sides according to the locations of the sensing points on the two sides in the same sampling; and
determining a directing point of the interactive device on the inductive screen according to a plurality of straight-line equations determined by a plurality of samplings in a sampling period.

Alternatively, the determining a directing point of the interactive device on the inductive screen according to a plurality of straight-line equations determined by a plurality of samplings in a sampling period includes:
determining, in a sampling period when the directing point of the interactive device on the inductive screen is fixed, a plurality of same first intersection points according to the plurality of straight-line equations determined by the plurality of samplings in the sampling period, each of the plurality of first intersection points being an intersection point of two of the plurality of straight-line equations determined by two samplings; and
determining the directing point of the interactive device on the inductive screen as the first intersection point.

Alternatively, the determining a directing point of the interactive device on the inductive screen according to a plurality of straight-line equations determined by a plurality of samplings in a sampling period includes:
determining, in a sampling period when the directing point of the interactive device on the inductive screen is moving, a plurality of different second intersection points according to the plurality of straight-line equations determined by the plurality of samplings in the sampling period, each of the plurality of second intersection points being an intersection point of two of the plurality of straight-line equations determined by two samplings; and
determining the directing point of the interactive device on the inductive screen as a geometric center point of an area formed by the plurality of second intersection points.

In still another aspect, there is provided a nonvolatile computer-readable storage medium, which includes a computer program. The computer program is executable by an electronic device, whereby the electronic device is configured to perform the positioning method as previously mentioned.

In still another aspect, there is provided a computer program product, which includes a computer program. The computer program is executable by an electronic device, whereby the electronic device is configured to perform the positioning method as previously mentioned.

The above description is merely an overview of the technical solutions of the present disclosure. In order to more apparently understand the technical means of the present disclosure to implement in accordance with the contents of specification, and to more readily understand above and other objectives, features and advantages of the present disclosure, specific embodiments of the present disclosure are provided hereinafter.

BRIEF DESCRIPTION OF THE DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below, in conjunction with the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, the words "first", "second", etc. are used to distinguish between the same or similar items whose functions and roles are basically the same. In order to clearly describe the technical solutions of the embodiments of the present disclosure, the words "first", "second", etc. cannot be understood as indicating or implying relative importance or implying the number of indicated technical features.

In the embodiments of the present disclosure, the orientations or positions represented by the terms of "inside", "outside", and the like are based on the accompanying drawings, they are merely for ease of a description of the present disclosure and a simplified description instead of being intended to indicate or imply the apparatus or component to have a special orientation or to be configured and operated in a special orientation. Thus, they cannot be understood as limiting of the present disclosure.

In the embodiments of the present disclosure, "a plurality of" refers to two or more, unless otherwise expressly specified.

Figure 1:
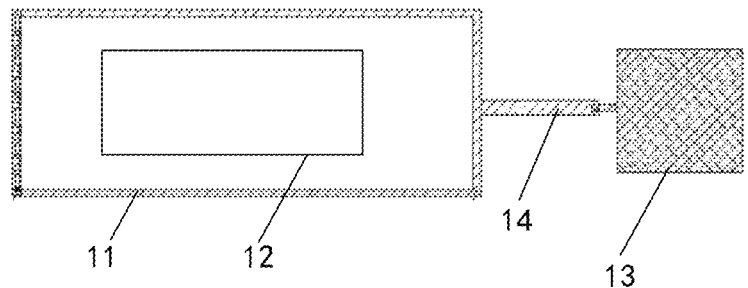
FIG. 1 is a schematic structural diagram of an interactive device according to an embodiment of the present disclosure.
Figure 2:
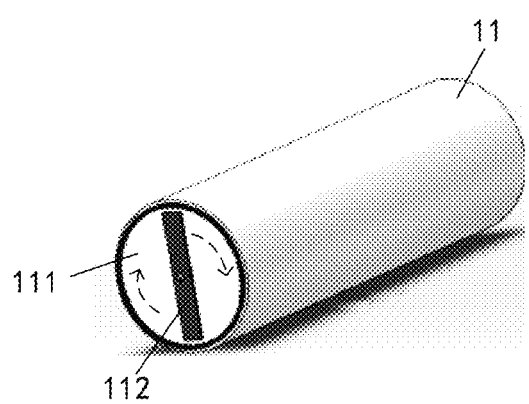
FIG. 2 is a schematic structural diagram of a first housing according to an embodiment of the present disclosure.

This embodiment of the present disclosure provides an interactive device. As shown in FIG. 1, the interactive device includes:

a first housing 11, a first end of the first housing 11 having a light-exit opening (not marked in FIG. 1, referring to a slit 112 in FIG. 2);

a first light-emitting component 12, arranged inside the first housing 11 and configured to emit a linear light beam through the light-exit opening of the first housing 11, the linear light beam rotating with rotation of the first housing 11; and a driving component 13, connected to the first housing 11 and configured to drive the first housing 11 to rotate.

Alternatively, the aforementioned first light-emitting component 12 may be at least partially arranged inside the first housing 11. For example, the first light-emitting component 12 may be wholly arranged inside the first housing 11, or the first light-emitting component 12 may be arranged in part inside the first housing 11.

Alternatively, the aforementioned first light-emitting component 12 also may not be arranged inside the first housing 11, but is connected to the first housing 11. For example, the first light-emitting component 12 is connected to one end of the first housing 11, etc., which is not particularly limited in the present disclosure.

Neither shape nor material of the above-mentioned first housing is limited. For example, the shape of the first housing may be a cylinder, a rectangular solid, and so on. The material of the first housing may be metal, resin, or the like. In FIG. 1, it is drawn by taking an example where a cross-section of the first housing along a direction parallel to a rotation axis is a rectangle.

A specific structure of the light-exit opening at the first end of the first housing is not limited, as long as the first light-emitting component can emit a linear light beam through the light-exit opening.

A specific structure of the above-mentioned driving component is not limited. As an example, the driving component may be a driving motor. The interactive device has a smaller size, and thus a micromotor may be used as the driving motor. A specific mode of connection between the driving component and the first housing is also not limited, which needs to be determined according to the structure of the driving component and the structure of the first housing. For example, if the driving component is a driving motor, the driving motor may be connected to a second end of the first housing through a connecting shaft 14 as shown in FIG. 1. In other examples, the driving component may be connected to the first housing by means of mechanical, electrical and magnetical methods, and can drive the first housing to rotate.

The specific structure of the first light-emitting component is also not limited. The first light-emitting component can emit visible light or invisible light. When the interactive device is used in conjunction with the inductive screen, to not have a negative effect on the display effect, the first light-emitting component may be employed to emit the invisible light, such as infrared light or ultraviolet light.

An embodiment of the present disclosure provides an interactive device, which includes: a first housing, a first light-emitting component, and a driving component. A first end of the first housing has a light-exit opening. The first light-emitting component is arranged inside the first housing and is configured to emit a linear light beam through the light-exit opening of the first housing, and the linear light beam can rotate with rotation of the first housing. The driving component is connected to the first housing and is configured to drive the first housing to rotate. The interactive device can emit a linear light beam, and the linear light beam can rotate with the rotation of the first housing. The interactive device is used in conjunction with the inductive screen to implement a low-cost positioning and interaction method.

Alternatively, as shown in FIG. 2, the light-exit opening of the first housing 11 is provided with a slit aperture.

Figure 3:
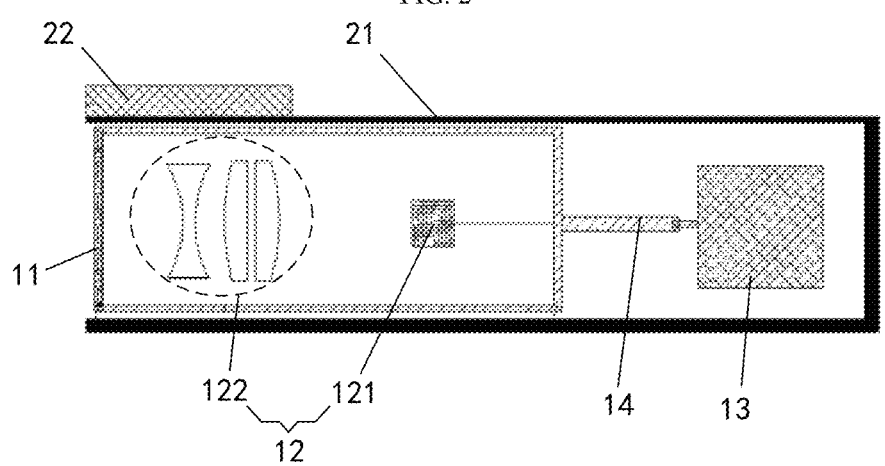
FIG. 3 is a schematic structural diagram of another interactive device according to an embodiment of the present disclosure.

With reference to FIG. 3, in one example, the first light-emitting component 12 may include:

a first light source 121, configured to emit an invisible light beam. wherein the invisible light beam emitted from the first light source is emitted after passing through the slit aperture.

In other examples, the first light-emitting component 12 may also include:

an optical component 122, configured to expand the invisible light beam emitted from the first light source.

When the optical component 122 is included, the invisible light beam emitted from the first light source 121 is emitted through the optical component 122 and the slit aperture in sequence.

The specific structure of the slit aperture is not limited. Referring to FIG. 2, the slit aperture may be a turntable 111, a slit 112 is provided on the turntable 111, and the invisible light beam emitted from the first light source may be emitted through the slit. The turntable and the slit on the turntable can rotate by 360 degrees within one rotation cycle. The linear light beam irradiating on the inductive screen may also rotate by 360 degrees synchronously. A center around in the entire rotation is a center point of the slit (or the turntable).

Neither type nor shape of the first light source is limited. For example, the first light source may be a Light Emitting Diode (LED) light source or a laser light source, and its shape may be a circle, a rectangle, or the like. The invisible light beam emitted from the first light source may be an infrared light beam or an ultraviolet light beam. That is, the first light source may be any one of an infrared diode light source, an infrared laser light source, an ultraviolet diode light source, and an ultraviolet laser light source. Of course, the first light source also may be other invisible light sources. In consideration of reducing adverse effects on users, the infrared diode light source or the infrared laser light source may be used.

The specific structure of the optical component is not limited. In FIG. 3, it is drawn by taking an example where the optical component includes one concave lens and two opposite convex mirrors. In fact, relevant optical components may be selected according to specific requirements, which is not to be described in detail here. The optical component can expand light beams emitted from the first light source, and can substantially increase a divergence angle of the first light source.

After being expanded by the optical component, the invisible light beams emitted from the first light source are emitted from the slit aperture. The light beams emitted from the slit aperture are linear light beams, i.e., straight-line light beams. Under the control of the driving component, the first housing rotates at a certain high frequency, and the slit aperture also rotates at a high frequency, such that the emitted linear light beam also rotates at a high frequency.

Alternatively, to facilitate the user to observe a directing point of the interactive device on the inductive screen, with reference to FIG. 3, in some examples, the interactive device may further include:

a second light-emitting component 22, configured to emit a visible light beam, wherein the visible light beam can be projected to outside of the interactive device.

In some examples, the interactive device may also include:

a second housing 21, wherein the first light-emitting component 12, the first housing 11 and the driving component 13 are arranged inside the second housing 21.

In some examples, the second light-emitting component 22 is arranged outside of the second housing 21.

Arrangement location of the second light-emitting component 22 may not be limited, as long as the visible light beam emitted from the second light-emitting component 22 can be projected to the outside of the interactive device.

Neither shape nor material of the above-mentioned second housing is limited. For example, the shape of the second housing may be a cylinder, a rectangular solid, and so on. The material of the second housing may be metal, resin, or the like. To reduce manufacturing difficulty and save manufacturing costs, the second housing and the first housing may be made from the same material. The second housing may be the same as or different from the first housing in shape. Preferably, the second housing is the same as the first housing in shape, to reduce the manufacturing difficulty. In FIG. 3, it is drawn by taking an example where cross-sections of the first housing and the second housing are both rectangles.

Alternatively, the second light-emitting component includes a second light source, and the second light source is a laser light source. In this case, the interactive device may be referred to as a laser pointer.

Alternatively, when the interactive device is used in conjunction with the inductive screen, to not have a negative effect on the display effect of the inductive screen, the first light source is any one of an infrared diode light source, an infrared laser light source, an ultraviolet diode light source, and an ultraviolet laser light source.

Figure 4:
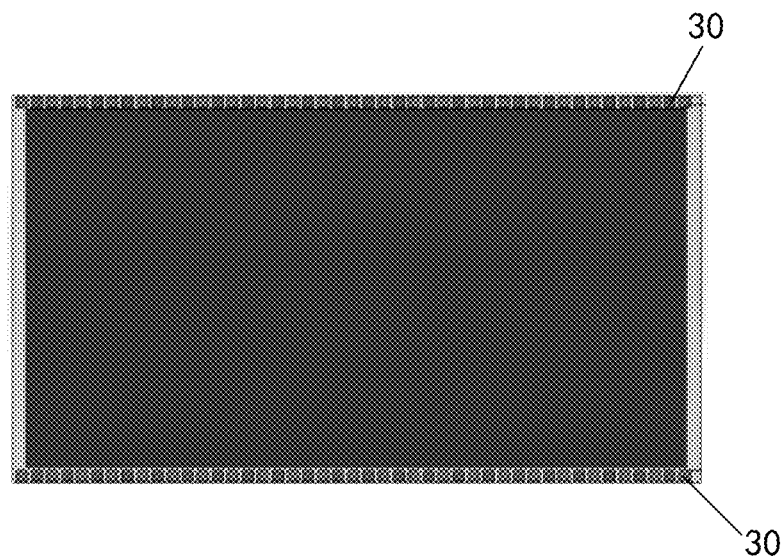
FIG. 4 is a schematic structural diagram of an inductive screen according to an embodiment of the present disclosure.

This embodiment of the present disclosure provides an inductive screen. As shown in FIG. 4, the inductive screen includes:

a photovoltaic sensor 30, arranged on two opposite sides of the inductive screen, wherein the photovoltaic sensor 30 is configured to sense a linear light beam emitted from the interactive device provided by the above Embodiment in each sampling, and output locations of sensing points on two sides; and a processor (not shown in FIG. 4), configured to: calculate a straight-line equation determined by the sensing points on the two sides according to the locations of the sensing points on the two sides in the same sampling; and determine a directing point of the interactive device on the inductive screen according to a plurality of straight-line equations determined by a plurality of samplings in a sampling period.

The photovoltaic sensor may be arranged on upper and lower sides of the inductive screen, or may be arranged on left and right sides of the inductive screen, which may be selected according to actual needs. For example, if the inductive screen is applied to a white projection screen fabric of a projector, the photovoltaic sensor may be arranged on the upper and lower sides of the inductive screen to prevent from damaging the rollable photovoltaic sensor. If the sensor screen is applied to a liquid crystal display with ultra-narrow bezels on left and right sides, it is unable to install the photovoltaic sensor because space on the left and right sides is small. In this case, the photovoltaic sensors may be arranged on the upper and lower sides of the inductive screen. In FIG. 4, it is drawn by taking an example where the photovoltaic sensor is arranged on the upper and lower sides of the inductive screen.

Types of the inductive screen are not limited. The inductive screen may be a semiconductor display screen such as a liquid crystal display (LCD) screen, an organic light-emitting diode (OLED) screen, and a micro light-emitting diode (Micro LED) screen, or a projection screen and a light-emitting diode (LED) screen, etc. If the inductive screen is the semiconductor display screen, the photovoltaic sensor may be integrated into the inductive screen directly by means of a semiconductor process when the inductive screen is manufactured. If the inductive screen is the projection screen or the LED screen, the photovoltaic sensor may be installed on the upper and lower edges of the screen by means of installation.

The inductive screen may be a flat inductive screen or a curved inductive screen, which is not limited here. The upper and lower sides of the inductive screen may be straight sides or curved sides. In FIG. 4, it is drawn by taking an example where the upper and lower sides of the inductive screen are straight sides. In this case, a plurality of photovoltaic sensors on the upper and lower sides are arranged in a straight line to form linear photovoltaic sensors.

The above-mentioned photovoltaic sensor is arranged in a non-display area of the inductive screen. Of course, the inductive screen also includes an active area. Here, only a structure related to the inventive concept is introduced, and other structures can be obtained through related technologies and common general knowledge.

Specific structures and types of the above photovoltaic sensor are not limited. The photovoltaic sensor may include a sensing chip that can sense a linear light beam and output locations of sensing points.

Types of the aforementioned central processing unit (CPU) are not limited either. The CPU may be a single-chip microcomputer, advanced RISC machines (ARM), or a field programmable gate array (FPGA), etc. Specifically, the CPU may be determined according to actual design requirements.

Reference is made by taking an example where the photovoltaic sensors are arranged on upper and lower sides of the inductive screen. In a single sampling, the photovoltaic sensors may respectively sense irradiation points of linear light beams of the photovoltaic sensors on the upper sides and irradiation points of the linear light beams of the photovoltaic sensors on the lower sides (trajectories of the linear light beams are formed by connecting irradiation points on the upper and lower sides), and output, to the CPU, the locations of the sensing points on the upper and lower sides. Based on the locations of the sensing points on the upper and lower sides, the CPU can calculate a straight-line equation (i.e., a connecting line between the irradiation points on the upper and lower sides) determined by the sensing points on the upper and lower sides. That is, after each single sampling, a straight-line equation can be determined. In one sampling period, the linear light beam is continuously rotating, and the photovoltaic sensor can perform a plurality of samplings, such that the processor can obtain a plurality of straight-line equations. A directing point of the interactive device on the inductive screen may be determined according to an intersection point of the plurality of straight-line equations.

When the directing point of the interactive device on the inductive screen is moving, the photovoltaic sensor on the inductive screen continuously samples and continuously positions the directing point of the interactive device, such that a moving trajectory of the directing point of the interactive device on the inductive screen can be obtained. In combination with an operating system of the inductive screen, interactive functions such as system operation and drawing can be implemented by means of the interactive device.

Figure 6:
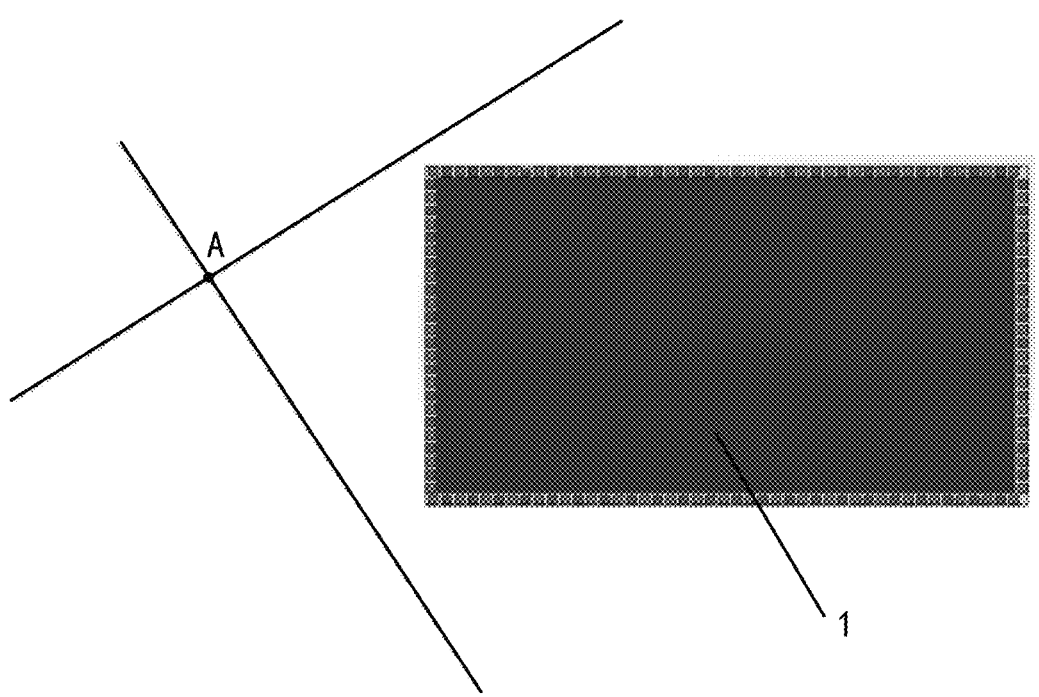
FIG. 6 is a schematic structural diagram of an inductive screen provided in the related technologies.

In the related technologies, referring to FIG. 6, for the interactive device employing cross-shaped irradiation lines, a blind area for recognition may exist when the directing point A is outside the inductive screen 1. However, in the present disclosure, when the directing point of the interactive device is outside the inductive screen, the inductive screen can still position the directing point when the linear light beam rotates to the location of the inductive screen. This is because the linear light beam emitted from the interactive device keeps rotating. In this way, when drawing outside the inductive screen, the function of synchronously displaying the drawing outside the inductive screen and inside the inductive screen can be implemented.

In addition, in other related technologies, to overcome the inconvenience of mouse operation and achieve the objective of controlling and operating the screen with a laser pointer, a conventional method is to process or attach a layer of photovoltaic sensor onto the surface of the LCD screen or of the display screen of the projector. The photovoltaic sensor can sense locations of light spots emitted from the laser pointer to perform positioning and interactive operations. However, this method requires to additionally provide an entire layer of photovoltaic sensors, leading to higher costs.

An embodiment of the present disclosure provides an inductive screen. The inductive screen includes a photovoltaic sensor and a processor. The photovoltaic sensor is arranged on two opposite sides of the inductive screen, and the photovoltaic sensor is configured to sense a linear light beam emitted from the interactive device in each sampling, and output locations of sensing points on two sides. The processor is configured to calculate a straight-line equation determined by the sensing points on the two sides according to the locations of the sensing points on the two sides in the same sampling, and determine a directing point of the interactive device on the inductive screen according to a plurality of straight-line equations determined by a plurality of samplings in a sampling period. The inductive screen is used in conjunction with the interactive device, which can determine the directing point of the interactive device on the inductive screen, and thus can implement positioning and interactive operations. Furthermore, the photovoltaic sensors are merely arranged on two opposite sides of the inductive screen. Compared with the related technologies, the number of photovoltaic sensors is greatly reduced, such that product costs are greatly reduced.

In following two cases, it is described in detail how to determine the directing point of the interactive device on the inductive screen by means of the intersection point of the plurality of straight-line equations.

In the first case, the processor is configured to: determine, in a sampling period when the directing point of the interactive device on the inductive screen is fixed, a plurality of the same first intersection points according to the plurality of straight-line equations determined by the plurality of samplings in the sampling period, each of the plurality of first intersection points being an intersection point of two of the plurality of straight-line equations determined by two samplings; and determine the directing point of the interactive device on the inductive screen as the first intersection point.

Figure 5:
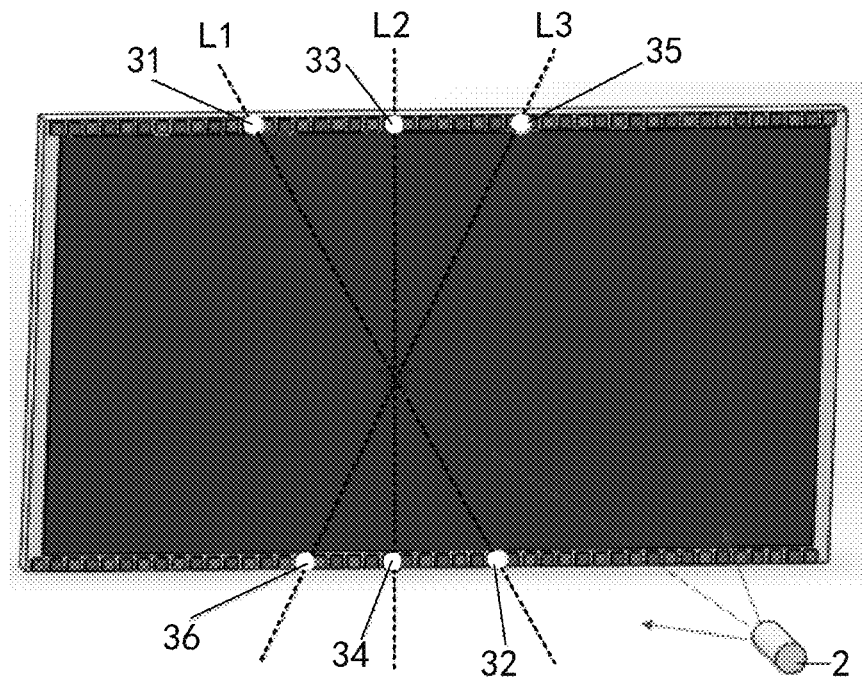
FIG. 5 is a schematic diagram showing a positioning principle of an inductive screen according to an embodiment of the present disclosure.

It should be noted that sampling is performed at least twice in one sampling period, and the specific sampling frequency is not limited here. In FIG. 5, principles of positioning the directing point of the interactive device on the inductive screen are illustrated by taking an example where the photovoltaic sensors are arranged on the upper and lower sides of the inductive screen.

In one sampling period, when the directing point of the interactive device on the inductive screen is fixed, as shown in FIG. 5, when a location of the linear light beam emitted from the interactive device 2 irradiating on the inductive screen is a location of a straight line L1, the photovoltaic sensors on the upper and lower sides respectively perform the first sampling to obtain a first upper side sampling point 31 and a first lower side sampling point 32 (i.e., sensing points of the photovoltaic sensors on the upper and lower sides). Next, locations of the first upper side sampling point 31 and of the first lower side sampling point 32 are sent to the processor, such that the processor calculates to obtain the straight-line equation of the straight line L1 according to the locations of the first upper side sampling point 31 and of the first lower side sampling point 32.

Similarly, after the linear light beam rotates, when the location of the linear light beam irradiating on the inductive screen is the location of a straight line L2, the photovoltaic sensors on the upper and lower sides respectively perform the second sampling to obtain a second upper side sampling point 33 and a second lower side sampling point 34. Next, locations of the second upper side sampling point 33 and of the second lower side sampling point 34 are sent to the processor, such that the processor calculates to obtain the straight-line equation of the straight line L2 according to the locations of the second upper side sampling point 33 and of the second lower side sampling point 34. According to the equation of the straight line L1 and the equation of the straight line L2, the processor can calculate the intersection point between the straight line L1 and the straight line L2 (i.e., the first intersection point). The intersection point between the straight line L1 and the straight line L2 is the directing point of the interactive device on the inductive screen in the above sampling period.

Of course, a third sampling is also performed in the above sampling period. As shown in FIG. 5, after the linear light beam rotates, when the location of the linear light beam irradiating on the inductive screen is the location of a straight line L3, the photovoltaic sensors on the upper and lower sides respectively perform the third sampling to obtain a third upper side sampling point 35 and a third lower side sampling point 36. Next, locations of the third upper side sampling point 35 and of the third lower side sampling point 36 are sent to the processor, such that the processor calculates to obtain the straight-line equation of the straight line L3 according to the locations of the third upper side sampling point 35 and of the third lower side sampling point 36. According to the equation of the straight line L1, the equation of the straight line L2 and the equation of the straight line L3, the processor can respectively calculate the intersection point between the straight line L1 and the straight line L2, the intersection point between the straight line L2 and the straight line L3, and the intersection point between the straight line L1 and the straight line L3. The above three intersection points overlap because the directing point of the interactive device on the inductive screen is fixed in this sampling period. The intersection point between the three straight lines is the directing point of the interactive device on the inductive screen in the aforementioned sampling period.

In the second case, the processor is configured to: determine, in a sampling period when the directing point of the interactive device on the inductive screen is moving, a plurality of different second intersection points according to the plurality of straight-line equations determined by the plurality of samplings in the sampling period, each of the plurality of second intersection points being an intersection point of two of the plurality of straight-line equations determined by two samplings; and determine the directing point of the interactive device on the inductive screen as a geometric center point of an area formed by the plurality of second intersection points.

In the second case, reference is made to the first case for the method for calculating the second intersection point by the processor, which is not unnecessarily described herein. The directing point of the interactive device on the inductive screen is moving in one sampling period. Therefore, the plurality of second intersection points calculated by the processor do not overlap. In this case, the processor can calculate a geometric center point of an area formed by the plurality of second intersection points. This geometric center point is the directing point of the interactive device on the inductive screen in the aforementioned sampling period. In one sampling period, the more frequently samplings are performed, the more straight lines are calculated, and the more second intersection points are calculated, and the higher the positioning accuracy of the directing point is determined thereby.

In the above two cases, it is to be noted that when sampling is performed more than three times in one sampling period, the processor can only calculate the intersection point between two straight-line equations determined by two adjacent samples. For example, reference is made by taking an example where sampling is performed thrice in one sampling period. The processor calculates the intersection point between the straight line L1 determined by the first sampling and the straight line L2 determined by the second sampling, the intersection point between the straight line L2 determined by the second sampling and the straight line L3 determined by the third sampling. The processor does not calculate the intersection point between the straight line L1 determined by the first sampling and the straight line L3 determined by the third sampling. Of course, the processor can also calculate the intersection point between two straight-line equations determined by any two samplings. For another example, reference is made by taking an example where sampling is performed thrice in one sampling period. The processor calculates the intersection point between the straight line L1 determined by the first sampling and the straight line L2 determined by the second sampling, the intersection point between the straight line L2 determined by the second sampling and the straight line L3 determined by the third sampling, and the intersection point between the straight line L1 determined by the first sampling and the straight line L3 determined by the third sampling. Complexity of calculation can be reduced in the former example, and accuracy of calculation can be improved in the latter example. Whether the former example or the latter example is selected may be determined according to actual conditions.

An embodiment of the present disclosure provides an interactive system, which includes the interactive device provided in the above Embodiment and the inductive screen provided in the above Embodiment.

In this interactive system, the inductive screen is used in conjunction with the interactive device, which can determine the directing point of the interactive device on the inductive screen, and thus can implement positioning and interactive operations. Furthermore, the photovoltaic sensors are merely arranged on two opposite sides of the inductive screen. Compared with the related technologies, the number of photovoltaic sensors is greatly reduced, such that product costs are greatly reduced. The interactive system overcomes the inconvenience of using a wireless remote mouse to operate a screen at a remote distance (here the remote distance is with respect to short-distance finger touch), and achieves the objectives of controlling and operating the screen by means of the interactive device. Furthermore, it is striven to reduce the number of photovoltaic sensors and integrated circuits (ICs), such that a control scheme is implemented at the lowest costs. This interactive system can implement a low-cost positioning and interactive method.

An embodiment of the present disclosure provides a positioning method, which is applied to the interactive system provided according to the above Embodiment. The interactive system includes an interactive device and an inductive screen.

The method includes following steps.

Step S01: sensing, in each sampling, a linear light beam emitted from the interactive device, and outputting locations of sensing points on two sides.

Step S02: calculating a straight-line equation determined by the sensing points on the two sides according to the locations of the sensing points on the two sides in the same sampling.

Step S03: determining a directing point of the interactive device on the inductive screen according to a plurality of straight-line equations determined by a plurality of samplings in a sampling period.

An embodiment of the present disclosure provides a positioning method, which is applied to the interactive system. The interactive system includes an interactive device and an inductive screen. The method includes: sensing, in each sampling, a linear light beam emitted from the interactive device, and outputting locations of sensing points on two sides; calculating a straight-line equation determined by the sensing points on the two sides according to the locations of the sensing points on the two sides in the same sampling; and determining a directing point of the interactive device on the inductive screen according to a plurality of straight-line equations determined by a plurality of samplings in a sampling period. The directing point of the interactive device on the inductive screen may be determined by means of this positioning method.

Alternatively, the Step S03 of determining a directing point of the interactive device on the inductive screen according to a plurality of straight-line equations determined by a plurality of samplings in a sampling period includes:

Step S101: determining, in a sampling period when the directing point of the interactive device on the inductive screen is fixed, a plurality of the same first intersection points according to the plurality of straight-line equations determined by the plurality of samplings in the sampling period, each of the plurality of first intersection points being an intersection point of two of the plurality of straight-line equations determined by two samplings; and Step S102: determining the directing point of the interactive device on the inductive screen as the first intersection point.

Alternatively, the Step S03 of determining a directing point of the interactive device on the inductive screen according to a plurality of straight-line equations determined by a plurality of samplings in a sampling period includes:

Step S201: determining, in a sampling period when the directing point of the interactive device on the inductive screen is moving, a plurality of different second intersection points according to the plurality of straight-line equations determined by the plurality of samplings in the sampling period, each of the plurality of second intersection points being an intersection point of two of the plurality of straight-line equations determined by two samplings; and Step S202: determining the directing point of the interactive device on the inductive screen as a geometric center point of an area formed by the plurality of second intersection points.

It is to be noted that reference may be made to the above Embodiments for related structures and positioning principles of the interactive device and the inductive screen mentioned above, which are not be repeated here.

"One embodiment", "embodiments" or "one or more embodiments" herein means that particular features, structures or characteristics described in combination with the embodiments are included in at least one embodiment of the present disclosure. Furthermore, it is to be noted that the term "in one embodiment" herein does not necessarily refer to the same embodiment.

Apparatus embodiments set forth above are merely exemplary, wherein units described as detached parts may be or not be detachable physically; parts displayed as units may be or not be physical units, i.e., either located at the same place, or distributed on a plurality of network units. Modules may be selected in part or in whole according to actual needs to achieve objectives of the solution of this embodiment. Those of ordinary skill in the art may comprehend and implement the embodiment without contributing creative effort.

Each of device embodiments of the present disclosure can be implemented by hardware, or implemented by software modules operating on one or more processors, or implemented by the combination thereof. Those skilled in the art should understand that, in practice, a microprocessor or a digital signal processor (DSP) may be employed to realize some or all of the functions of some or all of the parts in an electronic device according to the embodiments of the present disclosure. The present disclosure may further be implemented as device or apparatus program (for example, computer program and computer program product) for executing some or all of the methods as described herein. Such program for implementing the present disclosure may be stored in a computer readable medium, or have a form of one or more signals. Such a signal may be downloaded from the Internet websites, or be provided on a carrier signal, or provided in any other form.

Figure 7:
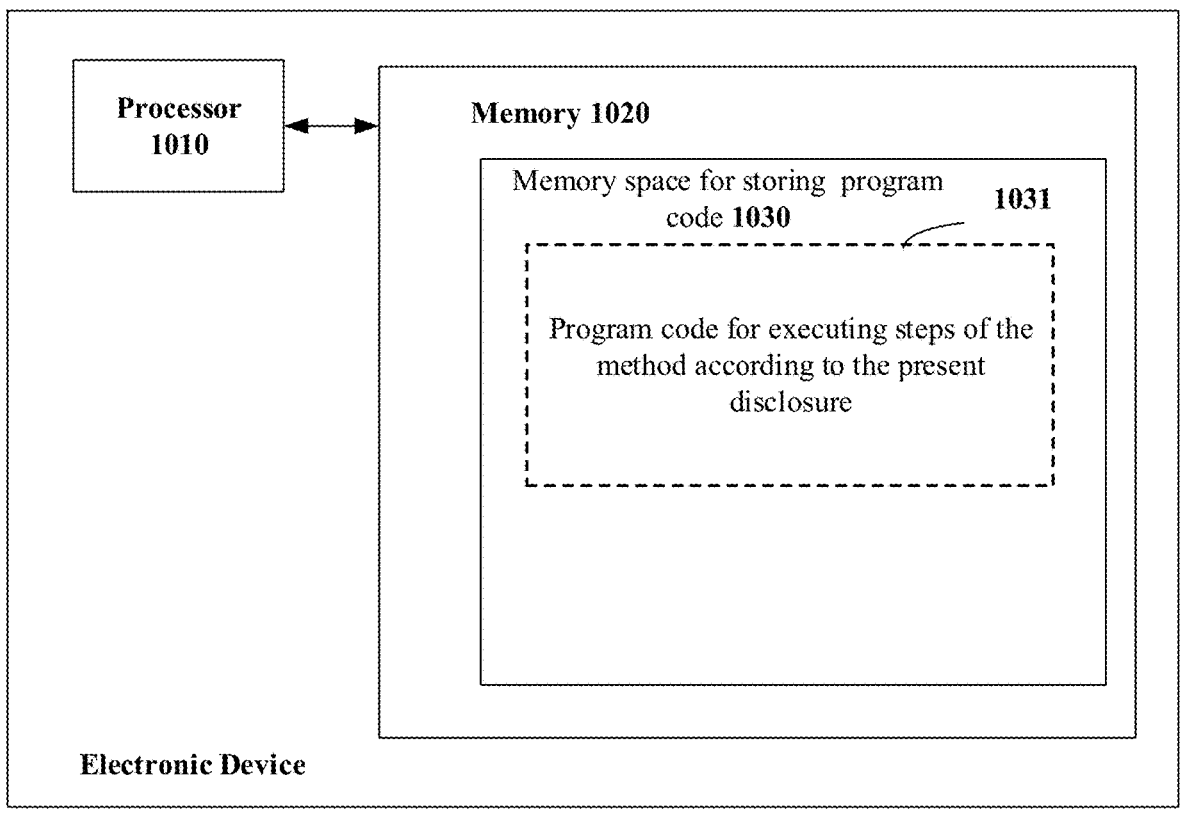
FIG. 7 schematically illustrates a block diagram of an electronic device for performing the method according to the present disclosure.
Figure 8:
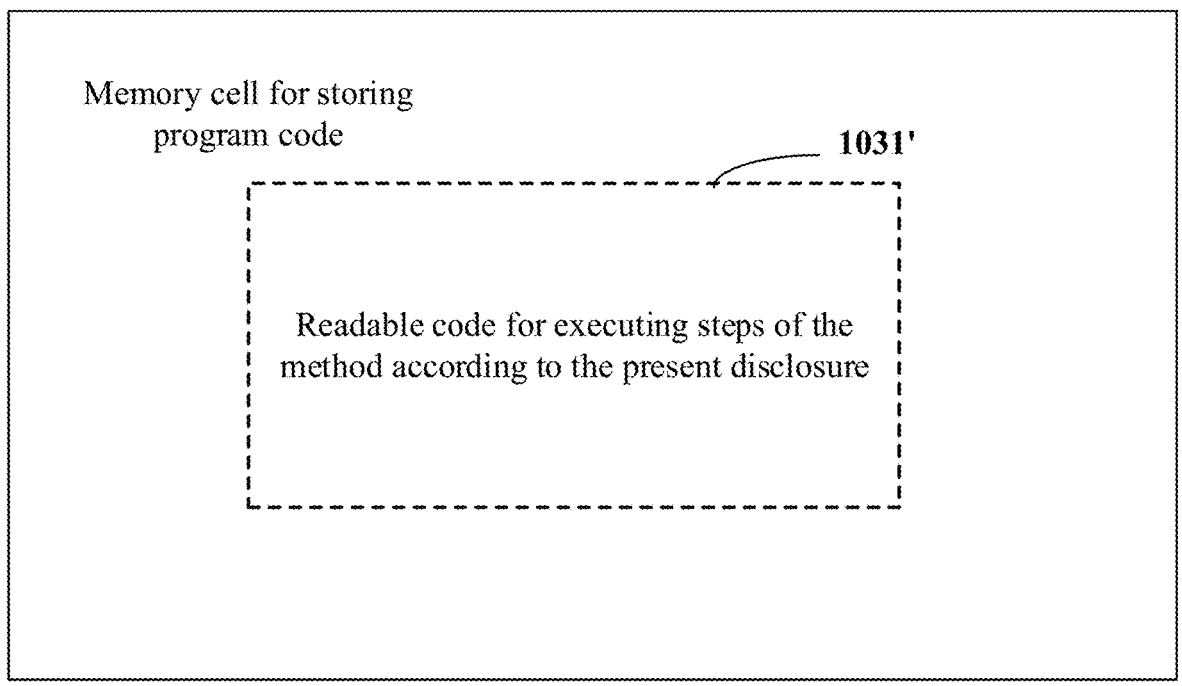
FIG. 8 schematically illustrates a memory cell for maintaining or carrying a computer program code for implementing the method according to the present disclosure.

For example, FIG. 7 illustrates an electronic device that may implement the method according to the present disclosure. Traditionally, the electronic device comprises a processor 1010 and a computer program product or a computer readable medium in form of a memory 1020. The memory 1020 may be electronic memories such as flash memory, EEPROM (Electrically Erasable Programmable Read-Only Memory), EPROM, hard disk or ROM. The memory 1020 has a memory space 1030 for storing program codes 1031 for executing any steps in the above methods. For example, the memory space 1030 for storing program codes may comprise respective program codes 1031 for executing the respective steps in the method as mentioned above. These program codes may be read from and/or be written into one or more computer program products. These computer program products include program code carriers such as hard disk, compact disk (CD), memory card or floppy disk. These computer program products generally are portable or stable memory cells as shown in reference FIG. 8. The memory cells may be provided with memory sections, memory spaces, etc., similar to the memory 1020 of the electronic device as shown in FIG. 7. The program codes may be compressed for example in an appropriate form. Generally, the memory cell includes computer readable codes 1031' which can be read for example by processors 1010. When these codes are operated on the electronic device, the electronic device may be caused to execute respective steps in the method as described above.

Many details are discussed in the specification provided herein. However, it should be understood that the embodiments of the present disclosure can be practiced without these specific details. In some examples, the well-known methods, structures and technologies are not shown in detail so as to avoid an unclear understanding of the description.

In the claims, no reference mark between round brackets shall impose restriction on the claims. The word "comprise" does not exclude a component or step not listed in the claims. The wording "a" or "one" in front of a component does not exclude the presence of a plurality of such components. In the unit claim listing a plurality of apparatuses, some of these apparatuses may be embodied in the same hardware.

The above is merely specific embodiments of the present disclosure, but the protection scope of the present disclosure is not limited thereto. Any variation or substitution easily conceivable to those skilled in the art shall fall into the protection scope of the present disclosure. Therefore, the protection scope of the present disclosure shall be subject to the protection scope of the claims.

The invention claimed is:

1. An interactive device, wherein the interactive device comprises:
   a first housing, a first end of the first housing having a light-exit opening;
   a first light-emitting component, arranged inside the first housing and configured to emit a linear light beam through the light-exit opening of the first housing, and the linear light beam rotating with rotation of the first housing; and
   a driving component, connected to the first housing and configured to drive the first housing to rotate.

2. The interactive device according to claim 1, wherein the first light-emitting component is at least partially arranged inside the first housing, or is connected to the first housing.

3. The interactive device according to claim 1, wherein the driving component is connected to a second end of the first housing opposite to the first end.

4. The interactive device according to claim 1, wherein, the light-exit opening of the first housing is provided with a slit aperture.

5. The interactive device according to claim 4, wherein, the first light-emitting component comprises:
   a first light source, configured to emit an invisible light beam;
   wherein the invisible light beam emitted from the first light source is emitted after passing through the slit aperture.

6. The interactive device according to claim 5, wherein the first light-emitting component further comprises:
   an optical component, configured to expand the invisible light beam emitted from the first light source;
   wherein the invisible light beam emitted from the first light source is emitted after passing through the optical component and the slit aperture in sequence.

7. The interactive device according to claim 6, wherein the interactive device further comprises:
a second light-emitting component, configured to emit a visible light beam;
wherein the visible light beam is projected to outside of the interactive device.

8. The interactive device according to claim 7, wherein the interactive device further comprises:
a second housing, wherein the first light-emitting component, the first housing and the driving component are arranged inside the second housing.

9. The interactive device according to claim 8, wherein the second light-emitting component is arranged outside the second housing.

10. The interactive device according to claim 9, wherein the second light-emitting component comprises a second light source, and the second light source is a laser light source.

11. The interactive device according to claim 5, wherein the first light source is any one of an infrared diode light source, an infrared laser light source, an ultraviolet diode light source, and an ultraviolet laser light source.

12. The interactive device according to claim 1, wherein the interactive device is a handheld interactive device.

13. An inductive screen, wherein the inductive screen comprises:
a photovoltaic sensor, arranged on two opposite sides of the inductive screen, wherein the photovoltaic sensor is configured to sense a linear light beam emitted from the interactive device according to claim 1 in each sampling, and output locations of sensing points on two sides; and
a processor, configured to: calculate a straight-line equation determined by the sensing points on the two sides according to the locations of the sensing points on the two sides in the same sampling; and determine a directing point of the interactive device on the inductive screen according to a plurality of straight-line equations determined by a plurality of samplings in a sampling period.

14. The inductive screen according to claim 13, wherein, the processor is configured to: determine, in a sampling period when the directing point of the interactive device on the inductive screen is fixed, a plurality of same first intersection points according to the plurality of straight-line equations determined by the plurality of samplings in the sampling period, each of the plurality of first intersection points being an intersection point of two of the plurality of straight-line equations determined by two samplings; and determine the directing point of the interactive device on the inductive screen as the first intersection point.

15. The inductive screen according to claim 13, wherein, the processor is configured to: determine, in a sampling period when the directing point of the interactive device on the inductive screen is moving, a plurality of different second intersection points according to the plurality of straight-line equations determined by the plurality of samplings in the sampling period, each of the plurality of second intersection points being an intersection point of two of the plurality of straight-line equations determined by two samplings; and determine the directing point of the interactive device on the inductive screen as a geometric center point of an area formed by the plurality of second intersection points.

16. An interactive system, wherein the interactive system comprises the interactive device according to claim 1 and an inductive screen, the inductive screen comprising:
a photovoltaic sensor, arranged on two opposite sides of the inductive screen, wherein the photovoltaic sensor is configured to sense a linear light beam emitted from the interactive device in each sampling, and output locations of sensing points on two sides; and
a processor, configured to: calculate a straight-line equation determined by the sensing points on the two sides according to the locations of the sensing points on the two sides in the same sampling; and determine a directing point of the interactive device on the inductive screen according to a plurality of straight-line equations determined by a plurality of samplings in a sampling period.

17. A positioning method, applied to the interactive system according to claim 16, the interactive system comprising the interactive device and the inductive screen;
the method comprising:
sensing, in each sampling, a linear light beam emitted from the interactive device, and outputting locations of sensing points on two sides;
calculating a straight-line equation determined by the sensing points on the two sides according to the locations of the sensing points on the two sides in the same sampling; and
determining a directing point of the interactive device on the inductive screen according to a plurality of straight-line equations determined by a plurality of samplings in a sampling period.

18. The method according to claim 17, wherein,
the determining a directing point of the interactive device on the inductive screen according to a plurality of straight-line equations determined by a plurality of samplings in a sampling period comprises:
determining, in a sampling period when the directing point of the interactive device on the inductive screen is fixed, a plurality of same first intersection points according to the plurality of straight-line equations determined by the plurality of samplings in the sampling period, each of the plurality of first intersection points being an intersection point of two of the plurality of straight-line equations determined by two samplings; and
determining the directing point of the interactive device on the inductive screen as the first intersection point.

19. The method according to claim 17, wherein,
the determining a directing point of the interactive device on the inductive screen according to a plurality of straight-line equations determined by a plurality of samplings in a sampling period comprises:
determining, in a sampling period when the directing point of the interactive device on the inductive screen is moving, a plurality of different second intersection points according to the plurality of straight-line equations determined by the plurality of samplings in the sampling period, each of the plurality of second intersection points being an intersection point of two of the plurality of straight-line equations determined by two samplings; and
determining the directing point of the interactive device on the inductive screen as a geometric center point of an area formed by the plurality of second intersection points.

20. A non-volatile computer-readable storage medium, comprising a computer program, the computer program is executable by an electronic device, whereby the electronic device is configured to perform the positioning method according to claim 17.

\* \* \* \* \*